July 24, 1951  E. C. WATERS ET AL  2,561,763
MATERIAL FLOW INDICATOR
Filed Dec. 24, 1948  2 Sheets-Sheet 1

Inventors
Edward C. Waters and
Frank S. McCullough
by Bean, Brooks, Buckley & Bean.
Attorneys

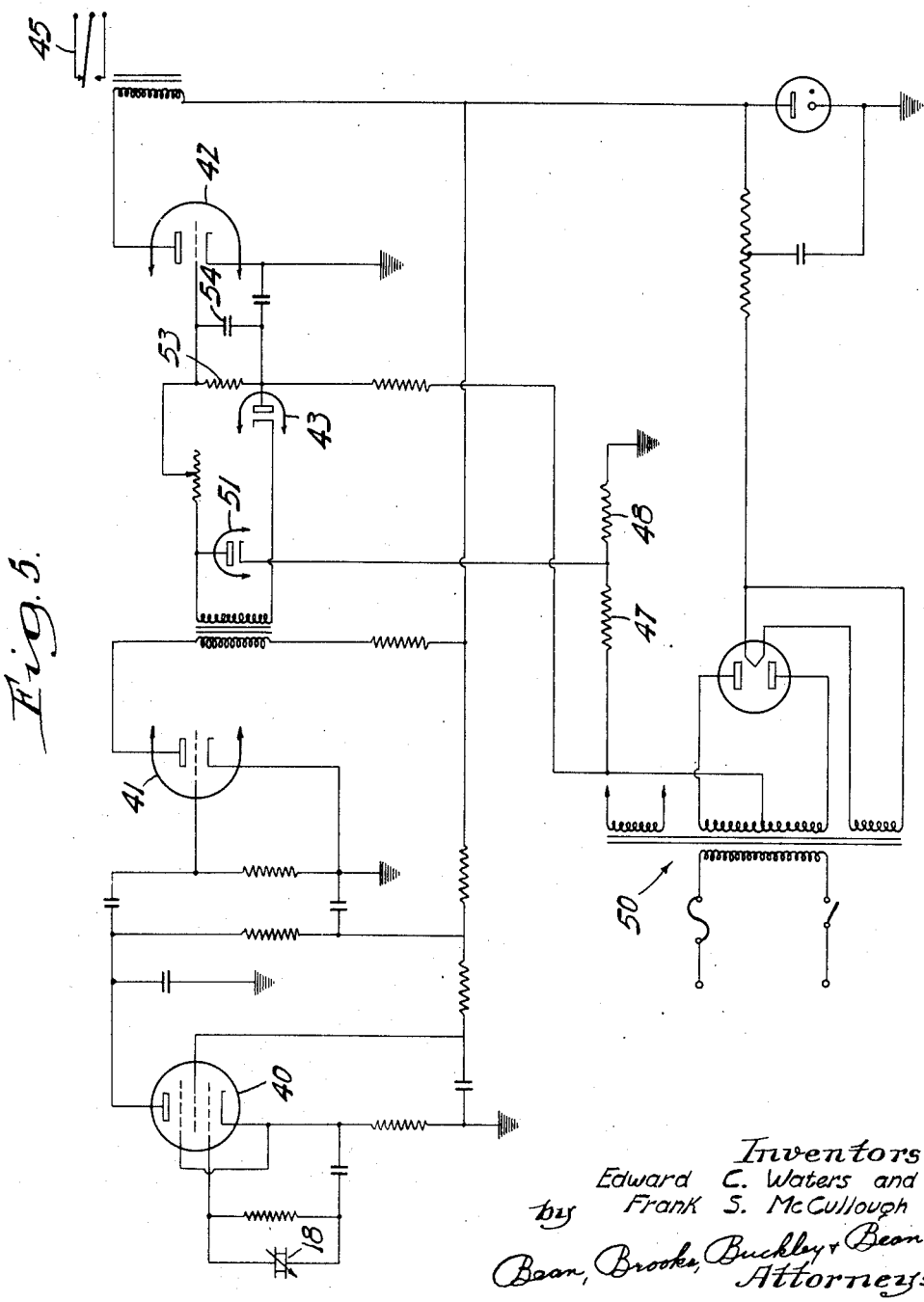

Patented July 24, 1951

2,561,763

UNITED STATES PATENT OFFICE 2,561,763

MATERIAL FLOW INDICATOR

Edward C. Waters, Niagara Falls, and Frank S. McCullough, Kenmore, N. Y., assignors to Buffalo Electronics Corporation, Kenmore, N. Y.

Application December 24, 1948, Serial No. 67,102

7 Claims. (Cl. 73—228)

This invention relates to means for detecting the flow of solid discrete materials through a chute, pipe, or other conduit.

In the handling of finely divided materials, such as flour in milling and similar plants, also various granular or powdered addition agents such as enrichers, fortifying agents, extenders, and the like, difficulty is encountered in making certain that the materials are properly feeding through chutes, pipes or other conducting devices. The problem of positively detecting flow of material in this general field is greatly complicated, in flour mills for instance, by the considerable vibration that is present in the plant and in the conducting devices, such vibrations tending to produce false indications in most types of flow detecting means.

The present invention comprises means whose primary sensitive element is disposed directly in the path of flow of the material whereby a direct indication of flow is afforded. The apparatus of the present invention is further arranged to insulate the sensitive means from the effects of extraneous vibration, even as to vibration of the chute or conduit itself, so that a proper indication is transmitted despite the objectionable conditions of vibration previously referred to.

According to the present invention, a needle is placed directly in the path of flow of discrete material, such as flour, so as to be subjected to varying pressures and deflected in varying degree by flow of material in varying rates of flow. In one practical application of the principles of the present invention, this deflection is impressed upon a piezoelectric crystal in the same manner that needle vibrations are impressed on such crystals in an ordinary phonograph. The change in electrical manifestations of the crystal under varying degrees of pressure or twist from the needle is amplified electronically, and the resultant varying electrical output is employed to give a direct indication of material flow.

While the foregoing arrangement is simple and practical, since ordinary commercial piezoelectric crystal cartridges, which are commercially available, may be employed, other transducing means may be employed. Instead of the piezoelectric crystal, the impulse of the needle or similar sensitive element may be made to act in a magnetic field to change the flow of flux and thus indicate changing conditions. Various magnetic arrangements employing permanent magnets or electromagnets by themselves or in various combinations may be arranged to convert the mechanical impulse of the needle into varying electrical energy. Other transducers known in the electrical arts are variable reluctance transducers and electrostatic or capacitance transducers.

One form of flow detector is shown in the accompanying drawing and described in the following specification by way of example and to illustrate the principles of the present invention. However, it is to be understood that various modifications may be made as indicated above without departing from the underlying principles of the present invention, the invention being limited only as defined in the appended claims.

In the drawings:

Fig. 5 is a general wiring diagram showing the amplifying means for converting the relatively feeble electrical impulse of the piezoelectric crystal into an electrical impulse of practically usable magnitude.

Figure 1:
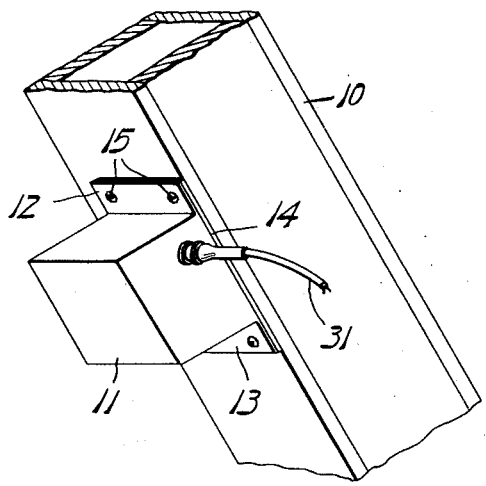
Fig. 1 is a fragmentary perspective view of an inclined chute having the detector portion of the apparatus of the present invention associated therewith.
Figure 2:
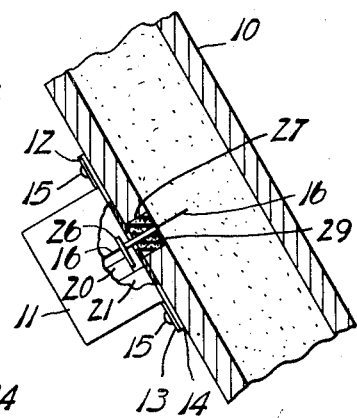
Fig. 2 is a fragmentary cross-sectional view taken longitudinally of the chute portion illustrated in Fig. 1.

Like characters of reference denote like parts throughout the several figures of the drawings, and the numeral 10, in Figs. 1 and 2, designates a closed inclined rectangular chute. The numeral 11 designates a box-like casing for the detecting portion of the apparatus of the present invention, and the casing is flanged at its open side as at 12 and 13 to receive a cover plate 14. Flanges 12 and 13 and cover plate 14 may be jointly secured against the under side of chute 10 as by means of screws 15 or otherwise.

The primary sensing element is in the form of a hollow tubular needle 16 which is held in the conventional needle chuck 17 of a commercial piezoelectric pickup cartridge 18. The needle is preferably hollow to minimize its inertia as compared with the frontal area which it presents to material flowing in the chute. In one practical form of detector constructed according to the present invention, a stainless steel tubular needle .032 inch in diameter and about two and one-half inches long was employed with satisfactory results.

The crystal cartridge 18 is mounted upon a block 20 of steel or the like of sufficient mass to have a relatively high inertia, and block 20 in turn is supported or cradled in a highly resilient mounting, as for instance, a pair of sponge rubber slabs 21 and 22 which cooperate to form a V block support for inertia block 20 when the casing 11 is in the inclined position illustrated in Figs. 1 and 2. A metal or other plate 23 is fixed to inertia block 20 and merely increases the bearing area of inertia block 20 against resilient block 22.

The high inertia and resistance to physical displacement of block 20, together with its highly resilient mounting, results in a condition wherein extraneous vibrations, even of the chute itself, are not imparted to block 20 in a degree sufficient to affect the operation of needle 16 and cartridge 18. Needle 16 is provided with a tubular guard or shield 25 which is supported rigidly by a plate 26 secured to inertia block 20.

Figure 4:
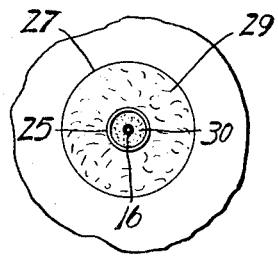
Fig. 4 is a fragmentary elevational view looking toward the end of the needle of the detector of Figs. 1 through 3.
Figure 3:
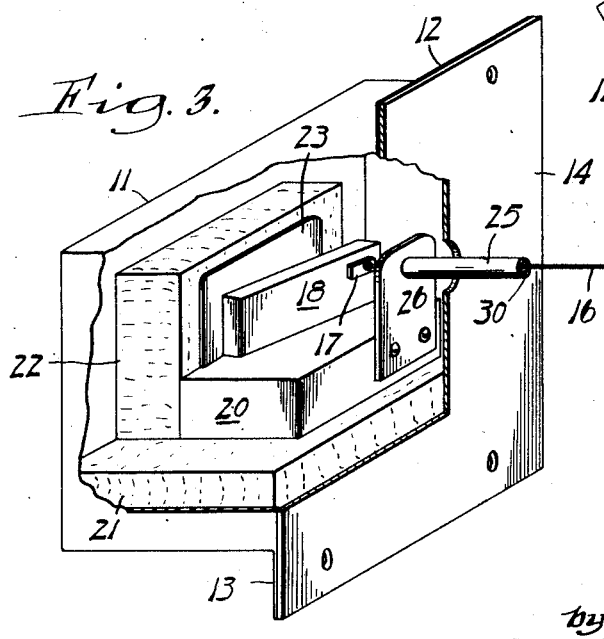
Fig. 3 is a perspective view of the detector portion of the present invention, disassembled from the chute, with portions of the casing thereof broken away as an aid to illustration.

The chute 10, preliminary to mounting the casing thereagainst, is formed with an opening 27 of considerably greater diameter than the diameter of tube 25, and a sponge rubber or other highly resilient collar 29 extends about tubular shield element 25 and provides a cushioned seal between tubular element 25 and opening 27. Finally, the space between the needle 16 and tubular member 25 at the point where the needle emerges from the tube is sealed with a thin and highly flexible coating of latex or the like as at 30 in Figs. 3 and 4. The electrical conductors which lead from cartridge 18 are designated 31 in Fig. 1 and extend to an electronic amplifying and rectifying system which is illustrated schematically in Fig. 5.

The amplification is sufficient to assure detection of minute deflections of the needle but, in one form of the present invention, overloading of the circuit by large movements of material which exert extreme pressure against the needle is prevented by the provision of a conventional limiter circuit. Referring to Fig. 5, the minute and varying output of the pickup cartridge 18 is applied to and variably biases the grid of a thermionic pentode tube 40, and the output therefrom is connected conventionally to one half, designated 41, of a double triode tube. The signal thus amplified is then applied to the other half of the double triode just mentioned, such other half being designated 42 in Fig. 5, and also to one half, designated 43, of a double diode tube.

Diode 43 converts the random signal from the output side of triode 41 into a direct current signal and applies a direct current cancelling bias across the grid and filament of triode 42, the plate current that flows in the output circuit of triode 42 being employed to operate a relay 45 or any other external control or signal device. Triode 42 is held in a no-plate-current condition through the use of a fixed bias obtained from the voltage drop across a pair of resistors 47 and 48 which are connected in series in the output side of a power supply transformer and potentiometer designated generally 50 in Fig. 5.

The bias developed by the signal applied to triode 42 from triode 41 is opposite in polarity to the fixed bias of resistors 47 and 48 and hence cancels the fixed bias when a predetermined magnitude is reached by the signal bias. Since this cancelling bias can exceed the fixed bias and cause triode 42 to draw grid current and allow damaging plate currents to be reached, a diode 51, which forms the other half of the double diode which includes diode 43, is connected as shown in Fig. 5, so that above a predetermined signal level a counter bias is developed which limits the plate current of triode 42 to a safe operating value.

Since the current in the output tube 42 is proportional to the needle deflection and this in turn is caused by the quantity of material striking the needle a measure of quantity can be obtained by using an indicating or recording meter in the output circuit of tube 42.

As described and as illustrated in Fig. 5 the amplifying and rectifying circuits are so arranged that the plate current of tube 42 is proportional to the deflection of the needle in the sensing element up to the safe operating limits of the tube.

If it is desired to have only an on or off indication in the plate circuit of tube 42, and one that will not respond to each individual particle pulse, a time delay or hold-down delay is provided in the following manner.

The bias developed by the signal is obtained across a resistor 53 and a capacitor 54 which are proportioned to give the proper bias and to interpose a time delay of several seconds to keep relay 45 from operating on each particle impulse. This serves to provide a smoothly operating output signal for the external control or signal circuits.

While the general electronic amplifying arrangement employed is not novel, it is set forth herein merely by way of completely disclosing one manner of practicing the invention. The remaining parts of the circuit, including the power supply, proportioning and rectifying means, are likewise entirely conventional.

The apparatus of the present invention has been described particularly, by way of example, in connection with detecting and measuring the flow of solid, discrete materials. However, it is to be understood that the apparatus may be used with any material or matter wherein it is operative to detect or measure flow, under the general principle that inventors are entitled to be protected in all the uses to which their apparatus may be put.

What is claimed is:

1. Means for detecting the flow of material in a chute or the like comprising a sensitive member disposed in the path of flow of the material, a piezoelectric crystal cartridge connected with said sensitive member whereby deflection of the sensitive member by impingement of material thereagainst varies the electrical output of the crystal, a support for said cartridge and sensitive member comprising a rigid body of substantial mass and relatively high inertia, a highly resilient mounting for said support to absorb and damp out vibrations extraneous to said support, and means for securing said resilient mounting adjacent to a chute or the like to dispose the sensitive member in the path of flow of material therein.

2. Means for detecting the flow of material in a chute or the like comprising a sensitive member disposed in the path of flow of the material, a transducer connected with said sensitive member whereby deflection of the sensitive member by impingement of material thereagainst varies the electrical output of the transducer, a support for said transducer and sensitive member comprising a rigid body of substantial mass and relatively high inertia, a highly resilient mounting for said support to absorb and damp out vibrations extraneous to said support, and means for securing said resilient mounting adjacent to a chute or the like to dispose the sensitive member in the path of flow of material therein.

3. Means for detecting the flow of material in a chute or the like comprising a sensitive member disposed in the path of flow of the material and adapted to be deflected in the direction of flow of the material by impingement of particles of material thereagainst, a transducing element connected with said sensitive member whereby deflection of the sensitive member by impingement of material thereagainst varies the electrical output of the transducing element, a support for said transducing element and said sensitive member comprising a rigid body of substantial mass and relatively high inertia, a highly resilient mounting for said support to absorb and damp out vibrations extraneous to said support, and means for securing said resilient mounting adjacent to a chute or the like to dispose the sensitive member in the path of flow of material therein.

4. Means for detecting the flow of material in a chute or the like comprising a needle element disposed in the path of flow of the material and adapted to be deflected in the direction of flow of the material by impingement of particles of material thereagainst, an electrical crystal connected with said needle element whereby deflection of the needle element by impingement of material thereagainst varies the electrical output of the crystal, a support for said crystal and needle element comprising a rigid body of substantial mass and relatively high inertia, a highly resilient mounting for said support to absorb and damp out vibrations extraneous to said support, and means for securing said resilient mounting adjacent to a chute or the like to dispose the needle element in the path of flow of material therein.

5. Means for detecting the flow of material in a chute or the like comprising a sensitive member disposed in the path of flow of the material and adapted to be deflected in the direction of flow of the material by impingement of particles of material thereagainst, a piezoelectric crystal cartridge connected with said sensitive member whereby deflection of the sensitive member by impingement of material thereagainst varies the electrical output of the crystal, a support for said cartridge and sensitive member comprising a rigid body of substantial mass and relatively high inertia, a highly resilient mounting for said support to absorb and damp out vibrations extraneous to said support, and means for securing said resilient mounting adjacent to a chute or the like to dispose the sensitive member in the path of flow of material therein.

6. Means for detecting the flow of material in a chute or the like comprising a sensitive member disposed in the path of flow of the material, transducing means connected with said sensitive member whereby deflection of the sensitive member by impingement of material thereagainst varies the electrical output of the transducing means to provide a flow-indicating signal, a support for said sensitive member comprising a rigid body of substantial mass and relatively high inertia, a highly resilient mounting for said support to absorb and damp out vibrations extraneous to said support, and means for securing said resilient mounting adjacent to a chute or the like to dispose the sensitive member in the path of flow of material therein.

7. Means for detecting the flow of material in a chute or the like comprising a sensitive member disposed in the path of flow of the material, a piezoelectric crystal cartridge connected with said sensitive member whereby deflection of the sensitive member by impingement of material thereagainst varies the electrical output of the crystal, a support for said cartridge and sensitive member comprising a rigid body of substantial mass and relatively high inertia, a resilient mounting for said support to absorb and damp out vibrations extraneous to said support, said mounting comprising a body of material having the general physical qualities of foam rubber, and means for securing said resilient mounting adjacent to a chute or the like to dispose the sensitive member in the path of flow of material therein.

EDWARD C. WATERS.
FRANK S. McCULLOUGH.

REFERENCES CITED

The following references are of record in the file of this patent:

UNITED STATES PATENTS

| Number | Name | Date |
|---|---|---|
| 1,581,957 | Keller | Apr. 20, 1926 |
| 1,935,445 | Heinz | Nov. 14, 1933 |
| 2,315,756 | Warner | Apr. 6, 1943 |
| 2,344,037 | Fuller | Mar. 14, 1944 |
| 2,445,731 | Jaycox | July 20, 1948 |